United States Patent [19]
Driscoll

[15] 3,671,572
[45] *June 20, 1972

[54] UNSATURATED POLYESTERS PREPARED FROM $\alpha,\alpha'$-DIMETHYL MUCONIC ACIDS

[72] Inventor: Gary L. Driscoll, Boothwyn, Pa.
[73] Assignee: Sun Oil Company, Philadelphia, Pa.
[*] Notice: The portion of the term of this patent subsequent to Feb. 25, 1986, has been disclaimed.
[22] Filed: March 10, 1969
[21] Appl. No.: 805,818

[52] U.S. Cl. ............... 260/485 G, 260/31.8 R, 260/31.8 HA, 260/45.85
[51] Int. Cl. ............................................. C07c 69/52
[58] Field of Search ............................................. 260/485 G

[56] References Cited

UNITED STATES PATENTS 3,429,949  2/1969  Driscoll .............................. 260/485 G

*Primary Examiner*—Lorraine A. Weinberger
*Assistant Examiner*—E. Jane Skelly
*Attorney*—George L. Church, Donald R. Johnson, Wilmer E. McCorquodale, Jr. and Kenneth H. Johnson

[57] ABSTRACT

Normally liquid curable polyesters that are plasticizers which add ultraviolet stability to solid vinyl chloride polymers are prepared from $\alpha,\alpha'$-dimethyl muconic acids and derivatives thereof and polyethylene glycols.

10 Claims, No Drawings

UNSATURATED POLYESTERS PREPARED FROM α,α'-DIMETHYL MUCONIC ACIDS

The present invention relates to normally liquid polyesters derived from dimethyl muconic acid moieties and polyethylene glycol moieties.

There are three geometric isomers of α, α'-dimethyl muconic acid.

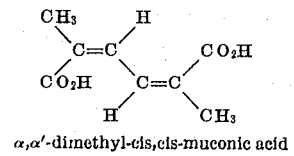

α,α'-dimethyl-cis,cis-muconic acid

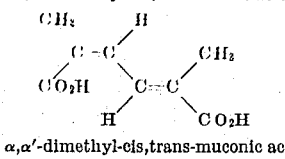

α,α'-dimethyl-cis,trans-muconic acid

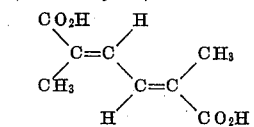

α,α'-dimethyl-trans,trans-muconic acid

These isomers are known in the art and the method for their production is shown in Elvidge et al., Journal Chemical Society, 1952, pp. 1,026–33. The method employed was the peracetic acid oxidation of p-xylenol to produce the cis,cis isomer. The cis,cis isomer is inverted by boiling alkali to the trans,trans isomer. This cis,trans acid was produced by treatment with methanolic sodium methoxide.

An alternative method for producing the α, α'-dimethyl-cis,cis-muconic acid is disclosed in copending application, Ser. No. 509,621, Raymond et al., filed Nov. 24, 1965 now U.S. Pat. No. 3,562,211 issued Feb. 9, 1971, which discloses a microbiological oxidation of alkyl benzenes. The cis,cis isomer is produced by a particular strain of microorganisms of genus Nocardia, more particular Nocardia coralline, a culture of which has been deposited with the American Type Culture Collection, Washington, D. C., under the number ATCC 19,070. This isomer can readily be isomerized to the cis,trans isomer or the trans,trans isomer under appropriate isomerization conditions.

The three isomeric dimethylmuconic acids are white crystalline powders with the following physical properties:

TABLE I

|  | cis,cis | cis,trans | trans,trans |
|---|---|---|---|
| Molecular Wt. | 170.2 | 170.2 | 170.2 |
| Melting Pt. °C. | 223–224[a] | 179–180[a] | 332–333° |
| Ionization Constants: |  |  |  |
| (at 25° C) pK$_1$ | 3.37 | 3.65 | — |
| pK$_2$ | 4.73 | 5.20 | — |
| Solubility, g/100 g. solution 25.0° C. |  |  |  |
| water | 0.026 | 0.244 | 0.0036 |
| Water | 0.24[b] | 1.97[b] | 00.032[b] |
| Ethyl Alcohol | 3.30 | 22.7 | 0.39 |
| Ethyl Acetate | 0.185 | 2.17 | 0.028 |
| Acetone | 0.994 | 7.60 | 0.112 |
| Benzene | 0.006 | 0.023 | 0.008 |
| Spectra: U.V., Visible max., (CH$_3$OH) | 273 | 278 | 282 |

[a]M.P. varies with the rate of heating
[b]At 80° C.

The present invention relates to linear interpolyesters containing a moiety derived from an organic diacid component selected from the group consisting of α, α'-dimethyl-cis,cis-muconic acid, α, α'-dimethyl-cis,trans-muconic acid, α, α'-dimethyl-trans,trans-muconic acid and mixtures thereof with each other and a moiety derived from an ether glycol component.

Briefly stated the present invention is a linear interpolyester characterized as having a glycol component and a dibasic component comprising the following structural unit $$-O-R-O-R''-O+R''-O\}_n R''-$$

where R is a bivalent radical selected from the group consisting of

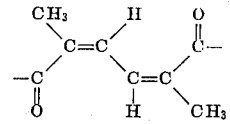

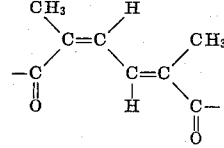

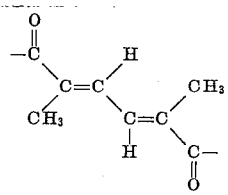

R'' is an ethylene radical and $n$ is 0 to 21, provided R in each structural unit is independently selected.

The procedure preferably employed in producing the present polyesters has been a melt transesterification. Other procedures, however, such as inert solution polymerization and pyridine polymerization using the acyl halides and the anhydrides of the acids or the diacids can be employed with satisfactory results.

Generally a stoichiometric ratio of diacid component to glycol component will be employed, although it is sometimes desireable to use an excess of the glycol component since some of the glycol is often lost during the polymerization procedure. A suitable mole ratio of glycol component of diacid component would be about 0.95:1.0 to 1.1:1.0.

In carrying out the esterifications, the diacids

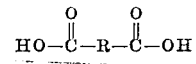

will usually be employed in the diester form as pointed out above. The organic diacid can be, for example, the acid form, the dimethyl and diethyl esters, the diacyl chlorides or the anhydrides of the dimethyl muconic.

The glycol is characterized by the formula $$HO-R''-O+R''-O\}_n R''-OH$$

where R'', is an ethylene radical, i.e., $-CH_2-CH_2-$, and $n$ is 0 to 21.

Suitable glycols are polyethylene glycols of number average molecular weight in the range of 100 to 1,000 such as diethylene glycol, triethylene glycol, tetraethylene glycol, decaethylene glycol, dodecaethylene glycol and the like.

The polyesters are characterized as being normally liquid at room temperature and having a molecular weight in the range of 600 to 20,000(number average).

The polyesters of the present invention are useful as plasticizers for polymer composition. In addition to being excellent plasticizers because of their high degree of compatibility with other polymer compositions, the present polyester composition act as ultraviolet stabilizers for the compositions.

The use of present polyesters is more fully discussed in commonly assigned U.S. Pat. No. 3,562,211 issued Feb. 9, 1971 to Richard D. Cassar and Jackson S. Boyer.

The following examples are presented to further illustrate the invention.

EXAMPLE 1

A viscous liquid polyester having a Brookfield Viscosity of 1,900 centipoise using a No. 4 spindle at 60 RPM was prepared in the following manner.

500 grams of $\alpha, \alpha'$-dimethyl-cis,cis-muconic acid, 1,320 grams of polyethylene glycol having a molecular weight average of about 300 (average $n \cong 4$) and 5 cc of tetraisopropyl titanate were blended with continuous agitation in a dry, nitrogen purged glass polymerization vessel. The vessel was heated to a temperature of 200° C. and maintained thereat for 6 hours with a continuous nitrogen purge. The reaction produce was vacuum distilled at 2 mm Hg for 4 hours to remove water and unreacted monomer. The distillation residue provided 1,146 grams of viscous polyester product.

Samples of solid vinyl chloride polymer were plasticized with 1.0; 2.0; 3.0 and 5.0 parts by weight respectively of the polyester of Example 1 and were found to have incremental improvement in ultraviolet stability with increasing polyester content as compared to a sample containing no such polyester.

EXAMPLE 2

A viscous liquid polyester having a Brookfield Viscosity of 1,670 centipoise using a No. 4 spindle at 60 RPM was prepared in the following manner.

582 grams of the dimethyl ester of $\alpha, \alpha'$-dimethyl-trans,trans-muconic acid, 1,170 grams of polyethylene glycol having an average molecular weight of about 300 were blended and heated in a glass polymerization vessel under a nitrogen atmosphere until the entire blend became molten. The melt was thereafter maintained at 200° C. while 4.0 cc of tetraisopropyl titanate catalyst was added and maintained for an additional 13 hours at 200° C. with continuous agitation. The resultant liquid product was vacuum distilled at 1 mm Hg pressure for 3 hours. The residue recovered comprised 1,500 grams of a thick viscous polyester liquid.

The invention claimed is:

1. A linear interpolyester prepared by reacting an organic diacid component selected from the group consisting of $\alpha, \alpha'$-dimethylcis, cis-muconic acid, $\alpha, \alpha'$-dimethyl-cis, trans-muconic acid, $\alpha, \alpha'$-dimethyl-trans, trans-muconic acid, the diesters thereof, the dianhydrides thereof, the diacylhalides thereof and mixtures thereof with each other and an ether glycol component characterized by the formula $$\text{HO}-\text{R}''-\text{O}-(\text{R}'-\text{O})_n-\text{R}''-\text{OH}$$

where R'', is an ethylene radical and $n$ is 0 to 21.

2. The interpolyester according to claim 1 wherein the organic diacid component is $\alpha, \alpha'$-dimethyl-cis, cis-muconic acid.

3. The interpolyester according to claim 1 wherein the organic diacid is $\alpha, \alpha'$-dimethyl-trans, trans-muconic acid.

4. The interpolyester according to claim 1 wherein the organic diacid component is $\alpha, \alpha'$-dimethyl-cis, trans-muconic acid.

5. The interpolyester according to claim 1 wherein the mole ratio of ether glycol component to organic diacid component is in the range of 0.95 : 1.0 to 1.1 : 1.0.

6. The interpolyester according to claim 5 wherein the molecular weight is in the range of 600 to 20,000.

7. The interpolyester according to claim 1 wherein the ether glycol component is selected from the group consisting of diethylene glycol, triethylene glycol, tetraethylene glycol, decoethylene glycol and dodecaethylene glycol.

8. The interpolyester according to claim 1 wherein the ether glycol component is polyethylene glycol having a molecular weight average of about 300.

9. The interpolyester according to claim 1 wherein the organic diacid component is $\alpha, \alpha'$-dimethyl-cis, cis-muconic acid and the ether glycol component is polyethylene glycol having a molecular weight average of about 300.

10. The interpolyester according to claim 1 wherein the organic diacid component is $\alpha, \alpha'$-dimethyl-trans, trans-muconic acid and the ether glycol component is polyethylene glycol having a molecular weight average of about 300.

* * * * *